(12) United States Patent
Khon (10) Patent No.: US 10,007,449 B2
(45) Date of Patent: Jun. 26, 2018

(54) MEMORY MANAGEMENT METHOD, MEMORY CONTROL CIRCUIT UNIT, AND MEMORY STORAGE APPARATUS

(71) Applicant: PHISON ELECTRONICS CORP., Miaoli (TW)

(72) Inventor: Luong Khon, Ho Chi Minh (VN)

(73) Assignee: PHISON ELECTRONICS CORP., Miaoli (TW)

( * ) Notice: Subject to any disclaimer, the term of this patent is extended or adjusted under 35 U.S.C. 154(b) by 45 days.

(21) Appl. No.: 15/002,325

(22) Filed: Jan. 20, 2016

(65) Prior Publication Data

US 2017/0160961 A1 Jun. 8, 2017

(30) Foreign Application Priority Data

Dec. 4, 2015 (TW) .............................. 104140677 A (51) Int. Cl.
*G06F 3/03* (2006.01)
*G06F 3/06* (2006.01)
*G06F 11/07* (2006.01)

(52) U.S. Cl.
CPC .......... *G06F 3/0619* (2013.01); *G06F 3/0659* (2013.01); *G06F 3/0679* (2013.01); *G06F 11/073* (2013.01); *G06F 11/0751* (2013.01); *G06F 11/0793* (2013.01)

(58) Field of Classification Search
CPC ................................... G06F 3/06; G06F 11/07
USPC ........................................ 711/152, 158, 169
See application file for complete search history.

(56) References Cited

U.S. PATENT DOCUMENTS

| 6,968,359 | B1* | 11/2005 | Miller | .................... | G06F 9/5061 |
| | | | | | 709/205 |
| 8,615,773 | B2* | 12/2013 | Bishop | .................... | G06F 9/542 |
| | | | | | 719/318 |
| 9,619,012 | B2* | 4/2017 | Magee | .................. | G06F 1/3287 |
| 2006/0090165 | A1* | 4/2006 | Martin | .................... | G06F 9/542 |
| | | | | | 719/318 |
| 2010/0082951 | A1* | 4/2010 | Bates | ....................... | G06F 9/463 |
| | | | | | 712/228 |
| 2017/0083847 | A1* | 3/2017 | Warnick | .......... | G06Q 10/06316 |

FOREIGN PATENT DOCUMENTS

TW I472927 2/2015
WO 2014143023 9/2014

OTHER PUBLICATIONS

"Office Action of Taiwan Counterpart Application," dated Jan. 24, 2017, p. 1-p. 6.

* cited by examiner

*Primary Examiner* — Pierre Miche Bataille
(74) *Attorney, Agent, or Firm* — JCIPRNET (57) ABSTRACT

A memory management method for a rewritable non-volatile memory module is provided. The memory management method includes determining whether a special event occurs; determining a type of at least one event in a work queue if the special event occurs, wherein the work queue stores a plurality of events and each event among the events is respectively configured to execute one corresponding work; adjusting the work executed by the at least one event from a first work to a second work according to the type of the at least one event, wherein the first work is different from the second work; and waiting to execute the second work after adjusting the first work to the second work.

30 Claims, 4 Drawing Sheets

MEMORY MANAGEMENT METHOD, MEMORY CONTROL CIRCUIT UNIT, AND MEMORY STORAGE APPARATUS

CROSS-REFERENCE TO RELATED APPLICATION

This application claims the priority benefit of Taiwan application serial no. 104140677, filed on Dec. 4, 2015. The entirety of the above-mentioned patent application is hereby incorporated by reference herein and made a part of this specification.

BACKGROUND OF THE INVENTION

Field of the Invention

The invention relates to a memory management method, and in particular, a memory management method for a rewritable non-volatile memory module, a memory control circuit unit, and a memory storage apparatus.

Description of Related Art

As digital cameras, mobile phones, and MP3 players have been growing rapidly in recent years, consumers' demand for storage media has also been growing significantly. With characteristics including data non-volatility, energy saving, small size, lack of mechanical structures, high reading/writing speed, etc., rewritable non-volatile memories are most suitable for these electronic products. Therefore, the flash memory industry has become a popular line among the electronics industries. For example, the embedded Multi Media Card (eMMC), which is widely used in mobile electronic devices, is one of the storage apparatuses that use the flash memory as the storage media.

Generally, when facing an abnormal power disconnection event, storage apparatuses (e.g., a solid state drive) using the rewritable non-volatile memory will need to complete execution of all necessary scheduled works in a work queue before the remaining temporary power (provided by a capacitor or a battery) is exhausted. However, occasionally, much time is consumed (or excessive temporary power is consumed) in executing the unnecessary scheduled works in the work queue, causing it impossible to execute the necessary scheduled works. Therefore, timely completing execution of the necessary works in the work queue after an abnormal power disconnection event occurs is one of the goals that people skilled in the art strive to reach.

SUMMARY OF THE INVENTION

The invention provides a memory management method, a memory control circuit unit, and a memory storage apparatus for saving time of processing works in a work queue after an abnormal power disconnection event occurs and further efficiently completing execution of necessary works before the remaining power is exhausted.

One exemplary embodiment of the invention provides a memory management method for a rewritable non-volatile memory module. The memory management method includes determining whether a special event occurs; determining a type of at least one event in a work queue if the special event occurs, wherein the work queue stores a plurality of events and each event among the events is respectively configured to execute one corresponding work; adjusting the work executed by the at least one event from a first work to a second work according to the type of the at least one event, wherein the first work is different from the second work; and waiting to execute the second work after adjusting the first work to the second work.

One exemplary embodiment of the invention provides a memory control circuit unit for controlling a memory storage apparatus. The memory control circuit unit includes a host interface, a memory interface, and a memory management circuit. The host interface is coupled to a host system. The memory interface is coupled to a rewritable non-volatile memory module. The memory management circuit is coupled to the host interface and the memory interface. The memory management circuit is configured to determine whether a special event occurs, wherein the memory management circuit is further configured to determine a type of at least one event in a work queue if the special event occurs, wherein the work queue stores a plurality of events and each event among the events is respectively configured to execute one corresponding work. The memory management circuit is further configured to adjust the work executed by the at least one event from a first work to a second work according to the type of the at least one event, wherein the first work is different from the second work. The memory management circuit is further configured to wait to execute the second work after adjusting the first work to the second work.

One exemplary embodiment of the invention provides a memory storage apparatus including a connection interface unit, a rewritable non-volatile memory module, and a memory control circuit unit. The connection interface unit is coupled to a host system. The memory control circuit unit is coupled to the connection interface unit and the rewritable non-volatile memory module. The memory control circuit unit is configured to determine whether a special event occurs, wherein the memory control circuit unit is further configured to determine a type of at least one event in a work queue if the special event occurs, wherein the work queue stores a plurality of events and each event among the events is respectively configured to execute one corresponding work. The memory control circuit unit is further configured to adjust the work executed by the at least one event from a first work to a second work according to the type of the at least one event, wherein the first work is different from the second work. The memory control circuit unit is further configured to wait to execute the second work after adjusting the first work to the second work.

In summary of the above, the memory management method, the memory control circuit unit, and the memory storage apparatus provided in the exemplary embodiments of the invention may adjust the scheduled commands in the work queue and have an unnecessary command replaced by a non-operation command or a reset command, so as to greatly reduce the time (power) taken in processing the unnecessary command. Moreover, the remaining temporary power saved would be sufficient to execute a necessary command.

To provide a further understanding of the aforementioned and other features and advantages of the invention, exemplary embodiments, together with the reference drawings, are described in detail below.

DESCRIPTION OF THE EMBODIMENTS

Figure 1:
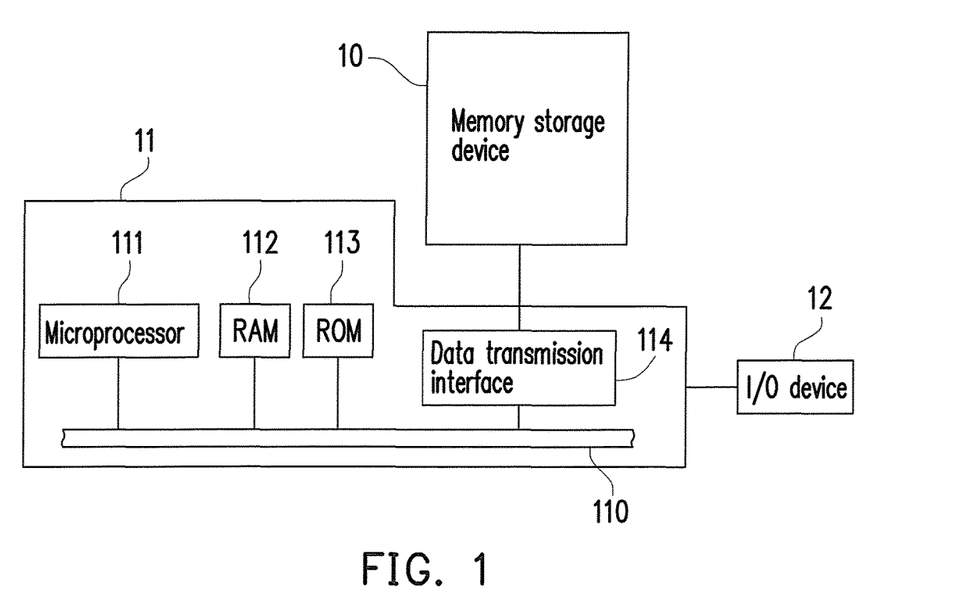
FIG. 1 is a schematic diagram illustrating a host system, a memory storage apparatus, and an I/O device according to one exemplary embodiment of the invention.
Figure 2:
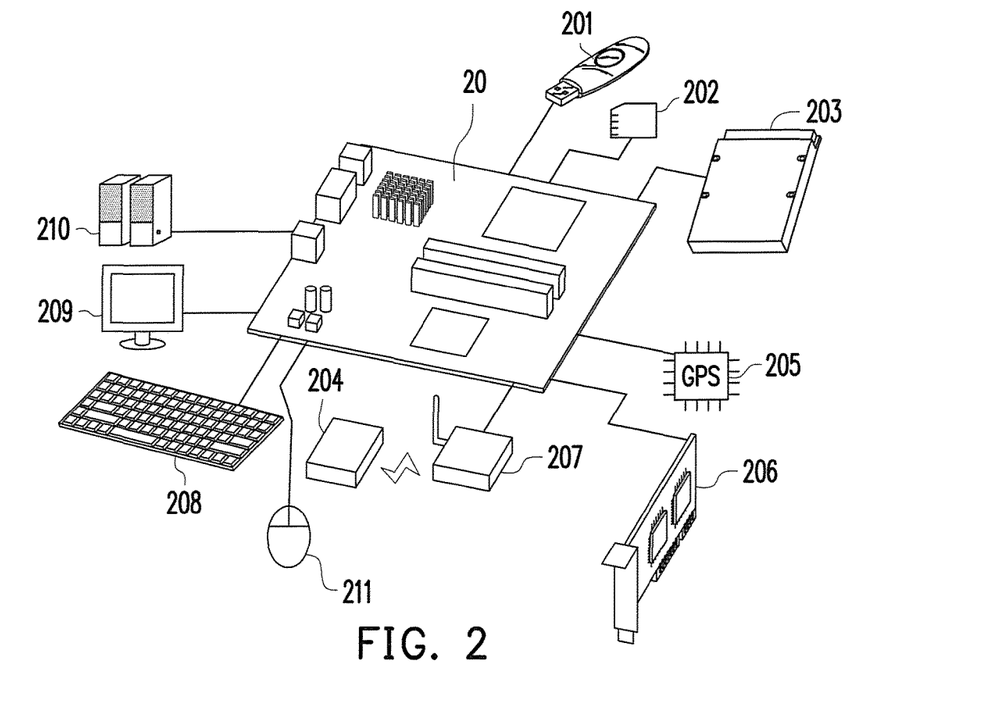
FIG. 2 is a schematic diagram illustrating a host system, a memory storage apparatus, and an I/O device according to another exemplary embodiment of the invention.

FIG. 1 is a schematic diagram illustrating a host system, a memory storage apparatus, and an I/O device according to one exemplary embodiment of the invention. FIG. 2 is a schematic diagram illustrating a host system, a memory storage apparatus, and an I/O device according to another exemplary embodiment of the invention.

Referring to FIG. 1 and FIG. 2, a host system 11 generally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In the present exemplary embodiment, the host system 11 is coupled to a memory storage apparatus 10 via the data transmission interface 114. For example, the host system 11 may write data to the memory storage apparatus 10 or read data from the memory storage apparatus 10 via the data transmission interface 114. Moreover, the host system 11 is coupled to the I/O device 12 via the system bus 110. For example, the host system 11 may transmit an output signal to the I/O device 12 or receive an input signal from the I/O device 12 via the system bus 110.

In the present exemplary embodiment, the processor 111, the random access memory 112, the read only memory 113, and the data transmission interface 114 may be installed on a motherboard 20 of the host system 11. The number of the data transmission interface 114 may be one or more. The motherboard 20 may be coupled to the memory storage apparatus 10 via the data transmission interface 114 through wired or wireless methods. The memory storage apparatus 10 is, for example, a flash drive 201, a memory card 202, a solid state drive (SSD) 203, or a wireless memory storage apparatus 204. The wireless memory storage apparatus 204 is a memory storage apparatus based on various wireless communication technologies, such as a near field communication (NFC) memory storage apparatus, a WiFi memory storage apparatus, a Bluetooth memory storage apparatus, or a low power Bluetooth memory storage apparatus (e.g., iBeacon). Moreover, the motherboard 20 may also be coupled via the system bus 110 to various I/O devices, such as a global positioning system (GPS) module 205, a network interface card 206, a wireless transmission device 207, a keyboard 208, a screen 209, a speaker 210, and a mouse 211. For example, in one exemplary embodiment, the motherboard 20 may access the wireless memory storage apparatus 204 via the wireless transmission device 207.

Figure 3:
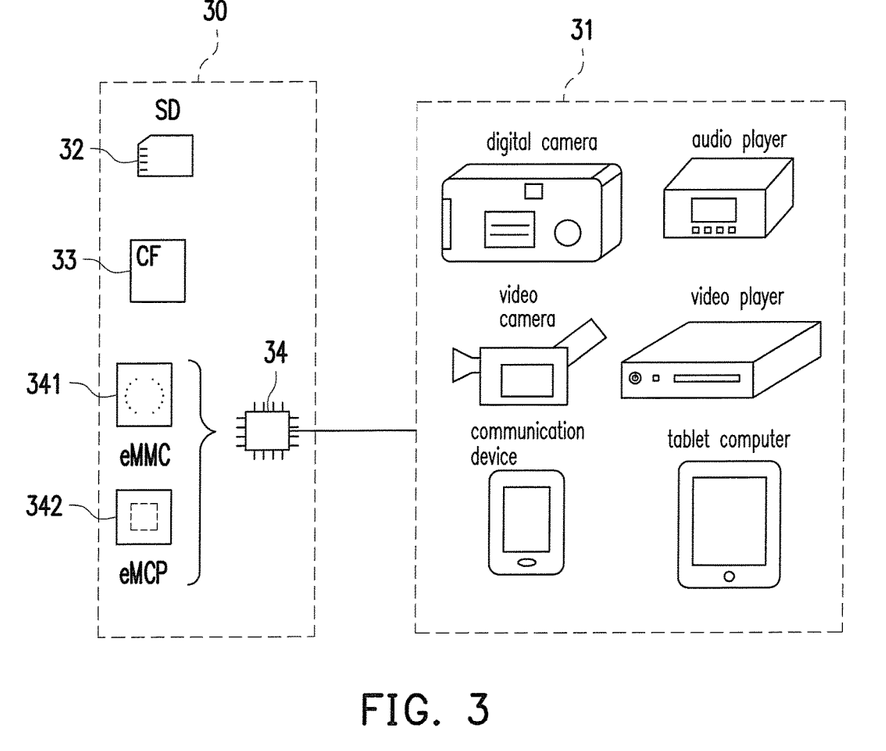
FIG. 3 is a schematic diagram illustrating a host system and a memory storage apparatus according to another exemplary embodiment of the invention.

In one exemplary embodiment, the foregoing host system is any system that substantially works with the memory storage apparatus to store data. In the exemplary embodiment above, the host system is illustrated with a computer system. However, FIG. 3 is a schematic diagram illustrating a host system and a memory storage apparatus according to another exemplary embodiment of the invention. Referring to FIG. 3, in another exemplary embodiment, a host system 31 may also be a system such as a digital camera, a video camera, a communication device, an audio player, a video player, a tablet computer, etc. A memory storage apparatus 30 is any of various types of non-volatile memory storage apparatuses used thereby, such as an SD card 32, a CF card 33, an embedded storage apparatus 34, etc. The embedded storage apparatus 34 is any of various types of embedded storage apparatuses directly coupling a memory module to a substrate of the host system, such as an embedded MMC (eMMC) 341 and/or an embedded multi chip package (eMCP) 342.

Figure 4:
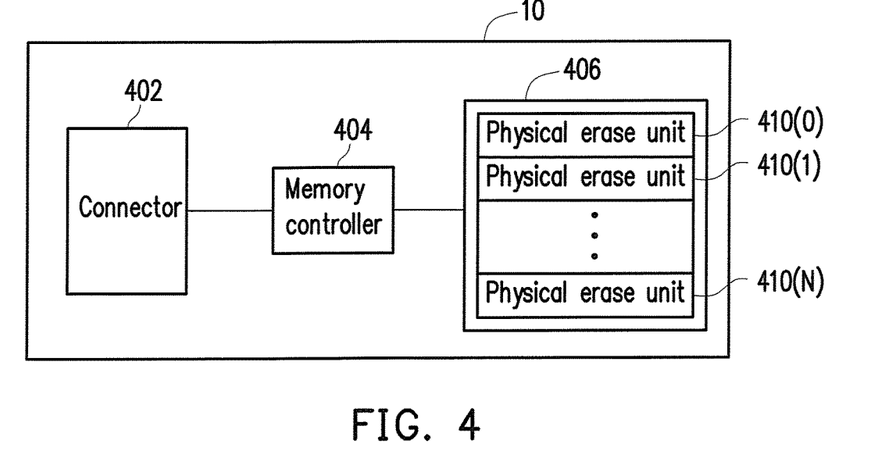
FIG. 4 is a schematic block diagram illustrating a memory storage apparatus according to one exemplary embodiment of the invention.

FIG. 4 is a schematic block diagram illustrating a memory storage apparatus according to one exemplary embodiment of the invention.

Referring to FIG. 4, the memory storage apparatus 10 includes a connection interface unit 402, a memory control circuit unit 404, and a rewritable non-volatile memory module 406.

In the present exemplary embodiment, the connection interface unit 402 is compatible with the Serial Advanced Technology Attachment (SATA) standard. However, it should be understood that the invention is not limited hereto. The connection interface unit 402 may also meet the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the Secure Digital (SD) interface standard, the Ultra High Speed-I (UHS-I) interface standard, the Ultra High Speed-II (UHS-II) interface standard, the Memory Stick (MS) interface standard, the Multi-Chip Package interface standard, the Multi Media Card (MMC) interface standard, the Embedded Multimedia Card (eMMC) interface standard, the Universal Flash Storage (UFS) interface standard, the embedded Multi Chip Package (eMCP) interface standard, the Compact Flash (CF) interface standard, the Integrated Device Electronics (IDE) standard, or other suitable standards. The connection interface unit 402 may be packaged with the memory control circuit unit 404 in one single chip, or the connection interface unit 402 is provided exterior to a chip including the memory control circuit unit 404.

Figure 5:
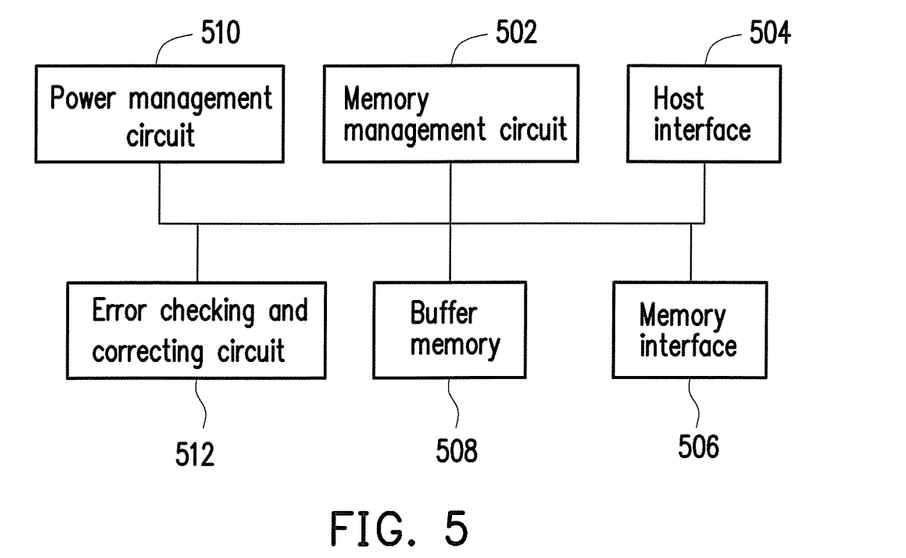
FIG. 5 is a schematic block diagram illustrating a memory control circuit unit according to one exemplary embodiment of the invention.

FIG. 5 is a schematic block diagram illustrating a memory control circuit unit according to one exemplary embodiment of the invention.

Referring to FIG. 5, the memory control circuit unit 404 includes a memory management circuit 502, a host interface 504, and a memory interface 506.

The memory management circuit 502 is configured to control an overall operation of the memory control circuit unit 404. Specifically, the memory management circuit 502 includes a plurality of control commands, and when the memory storage apparatus 10 is operating, the control commands are executed to perform operations of data writing, reading, erasing, etc.

In the present exemplary embodiment, the control commands of the memory management circuit 502 are implemented in the form of firmware. For example, the memory management circuit 502 includes a microprocessor unit (not illustrated) and a read only memory (not illustrated), and the control commands are burn recorded to the read only memory. When the memory storage apparatus 10 is operating, the control commands are executed by the microprocessor unit to perform operations of data writing, reading, erasing, etc. It should be noted that the following operations executed by the memory management circuit 502 also represent the overall operation of the memory control circuit unit 404.

In another exemplary embodiment of the invention, the control commands of the memory management circuit 502 may also be stored in the form of codes in specific areas (e.g., a system area exclusively used for storing system data in a memory module) of the rewritable non-volatile memory module 406. Moreover, the memory management circuit 502 includes a microprocessor unit (not illustrated), a read only memory (not illustrated), and a random access memory (not illustrated). Particularly, the read only memory includes a boot code, and when the memory control circuit unit 404 is enabled, the microprocessor unit first executes the boot code segment to load the control commands stored in the rewritable non-volatile memory module 406 to the random access memory of the memory management circuit 502. Afterwards, the microprocessor unit operates the control commands to perform operations of data writing, reading, erasing, etc.

The host interface 504 is coupled to the memory management circuit 502 and is configured to couple to the connection interface unit 402 to receive and recognize commands and data transmitted by the host system 11. In other words, the commands and data transmitted by the host system 11 are transmitted to the memory management circuit 502 via the host interface 504. In the present exemplary embodiment, the host interface 504 is compatible with the eMMC standard. However, it should be understood that the invention is not limited hereto. The host interface 504 may also be compatible with the PATA standard, the IEEE 1394 standard, the PCI Express standard, the UFS standard, the UHS-I interface standard, the UHS-II interface standard, the SD standard, the MS standard, the SATA standard, the CF standard, the IDE standard, or other suitable data transmission standards.

The memory interface 506 is coupled to the memory management circuit 502 and is configured to access the rewritable non-volatile memory module 406. In other words, data to be written to the rewritable non-volatile memory module 406 is converted into a format acceptable by the rewritable non-volatile memory module 406 through the memory interface 506.

In one exemplary embodiment, the memory control circuit unit 404 further includes a buffer memory 508, a power management circuit 510, and an error checking and correcting circuit 512.

The buffer memory 508 is coupled to the memory management circuit 502 and is configured to temporarily store data and instructions from the host system 11 or data from the rewritable non-volatile memory module 406.

The error checking and correcting circuit 512 is coupled to the memory management circuit 502 and is configured to execute an error checking and correcting procedure to ensure correctness of the data. Specifically, when the memory management circuit 502 receives a write command from the host system 11, the error checking and correcting circuit 512 generates an error checking and correcting code (ECC Code) for the data corresponding to the write command, and the memory management circuit 502 writes the data corresponding to the write command and the corresponding error checking and correcting code to the rewritable non-volatile memory module 406. Afterwards, when reading the data from the rewritable non-volatile memory module 406, the memory management circuit 502 simultaneously reads the error checking and correcting code corresponding to the data, and the error checking and correcting circuit 512 performs the error checking and correcting procedure on the read data according to the error checking and correcting code.

The power management circuit 510 is coupled to the memory management circuit 502 and is configured to control power of the memory storage apparatus 10. In addition, in the present exemplary embodiment, the power management circuit 510 is also configured to detect occurrences of power disconnection events, wherein the power disconnection events are divided into normal power disconnection events and abnormal power disconnection events (hereinafter also called power failure events).

Specifically, normal power disconnection events are, for example, default operations for disconnecting power, such as shutdown or hibernation of the host system 11 executed by a user, or where the host system 11 enters operations for disconnecting power, such as shutdown or hibernation, according to configurations of the operating system installed on the host system. By contrast, power failure events are, for example, power disconnection events that are not controlled by the user or the host system 11, such as sudden disconnection (e.g., a power outage event) of the power inputted to the host system 11 or exhaustion of a battery connected to the host system.

Moreover, the power management circuit 510 further includes at least one capacitor configured to supply temporary power to the memory storage apparatus 10 after a power failure event occurs. However, the invention is not limited hereto. For example, in another exemplary example, the power management circuit 510 is further coupled to at least one battery (or another suitable device for storing electricity) to supply temporary power to the memory storage apparatus 10.

In the present exemplary embodiment, when the power management circuit 510 detects occurrence of a power failure event, the power management circuit 510 issues a power failure notification to the memory management circuit 502 such that the memory management circuit 502 can perform an operation regarding the power failure event by using the foregoing temporary power.

Specifically, after receiving the power failure notification, the memory management circuit 502 starts to execute a special processing procedure corresponding to the power failure event. For example, in the present exemplary embodiment, the memory management circuit 502 first suspends part or all of the works being executed and preferentially first processes the works that must be done among the suspended works by using the temporary power. The foregoing "power failure notification" may used for the memory management circuit 502 to determine whether a power failure event occurs, wherein the power failure event is one of special events. In the present exemplary embodiment, the special events include the power failure event, a work queue quick execution event, or a work queue deletion event.

It should be mentioned that in the present exemplary embodiment, the memory management circuit 502 determines whether one of the special events occurs. Moreover, according to a determination result of whether the special event occurs, the memory management circuit 502 starts to execute a special processing procedure corresponding to the special event provided in the present exemplary embodiment.

Since the memory management method provided in the present exemplary embodiment is relevant to work scheduling, operation of work scheduling of the memory management circuit 502 in the present exemplary embodiment will be first detailed below, and then how the memory management method provided in the present exemplary embodiment optimizes work scheduling in the special processing procedure will be next described.

In the present exemplary embodiment, the memory management circuit 502 receives a plurality of commands (e.g., a write command of writing user data) from the host system 11. Moreover, the memory management circuit 502 itself also executes a plurality of system commands to perform operations (e.g., a data merge command or a trash recycle command) of managing the rewritable non-volatile memory module 406. The memory management circuit 502 stores command descriptions of each of the commands (also called event execution commands) to be executed on the rewritable non-volatile memory module 406 to specific blocks (e.g., memory parameter unit, or flash parameter units (FPU), refers to memory parameter unit hereinafter) in the buffer memory 508. In other words, the command descriptions of each of the event execution commands are stored to the memory parameter units respectively corresponding to each of the event execution commands. The memory management circuit 502 uses a plurality of pointers to point to the specific blocks corresponding to each of the commands such that the memory management circuit 502 can use the pointers to obtain the command descriptions recorded in the specific blocks from the specific blocks pointed to by the pointers, and further execute the event execution commands through the command descriptions. In short, it may also be regarded that the memory management circuit 502 uses the pointers to point to the corresponding event execution commands and thereby performs the works corresponding to the commands.

Moreover, the memory management circuit 502 may further store and sequence a plurality of events to the work queue and processes the events in the work queue by executing the work queue so as to execute the commands/ works corresponding to the events. In other words, it may also be regarded that the memory management circuit 502 is to perform (process) a plurality of events and store the events to be performed by using the work queue, wherein each of the events is respectively configured to execute the work corresponding to each event among the events. In addition, each of the events stored in the work queue has an pointer. As described above, the pointer of each of the events is configured to point to the memory parameter unit corresponding to the event thereof to execute the event execution command corresponding to each of the events according to the command description stored in the memory parameter unit corresponding to each of the events, so as to further perform the work corresponding to each of the events. In short, each of the events stored in the work queue points to the event execution command respectively corresponding to each of the events.

It should be noted that in the invention, the element for storing the command description is not limited to the buffer memory 508. For example, in another exemplary embodiment, the memory management circuit 502 stores the command description of each of the commands to be executed on the rewritable non-volatile memory module 406 to the random access memory of the memory management circuit 502 or another suitable memory.

To facilitate description, in the following, the single "memory parameter unit" is used to represent the specific block recording the command description corresponding to one single event execution command. Moreover, the action that the pointer of each of the events points to the memory parameter unit corresponding to each of the events may also be represented by the action that each of the events points to the event execution command corresponding to each of the events. However, in another exemplary embodiment, a manufacturer may also design other suitable forms to record the command descriptions or the event execution commands. For example, in another exemplary embodiment, the memory management circuit 502 may also directly store and sequence a plurality of event execution commands to the work queue to perforin the works corresponding to the event execution commands.

Figure 6:
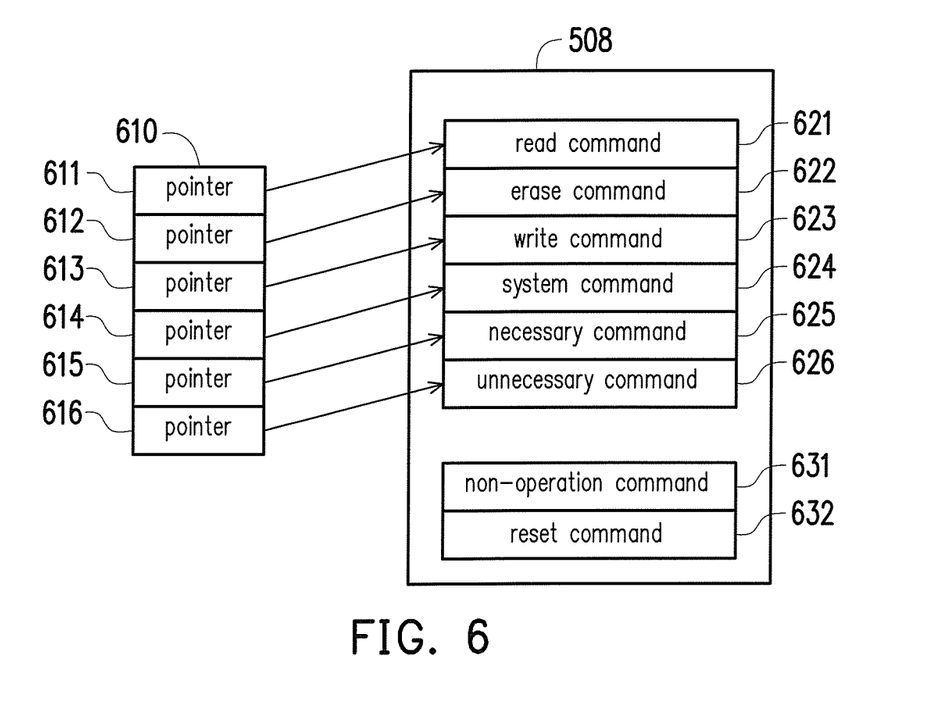
FIG. 6 is an operational schematic diagram of pointers according to one exemplary embodiment of the invention.

FIG. 6 is an operational schematic diagram of pointers according to one exemplary embodiment of the invention.

Referring to FIG. 6, for example, suppose that the memory management circuit 502 records the command descriptions of a plurality of event execution commands respectively to a plurality of memory parameter units 621 to 626 and memory parameter units 631, 632 in the buffer memory 508. In the present exemplary embodiment, the event execution commands include write commands from the host system, read commands, erase commands, system commands, necessary commands, unnecessary commands, non-operation commands, and reset commands. However, the invention is not limited hereto. The event execution commands may also include other commands that can be executed by the memory management circuit 502.

As FIG. 6 illustrates, the memory parameter unit 621 records a command description corresponding to a read command (it can also be said that the memory parameter unit 621 records a read command); the memory parameter unit 622 records a command description corresponding to an erase command (it can also be said that the memory parameter unit 621 records an erase command); the memory parameter unit 623 records a command description corresponding to a write command (it can also be said that the memory parameter unit 621 records a write command); the memory parameter unit 624 records a command description corresponding to a system command (it can also be said that the memory parameter unit 621 records a system command); the memory parameter unit 625 records a command description corresponding to a necessary command (it can also be said that the memory parameter unit 621 records a necessary command); the memory parameter unit 626 records a command description corresponding to an unnecessary command (it can also be said that the memory parameter unit 621 records an unnecessary command); the memory parameter unit 631 records a command description corresponding to a non-operation command (it can also be said that the memory parameter unit 621 records a non-operation command); and the memory parameter unit 632 records a command description corresponding to a reset command (it can also be said that the memory parameter unit 621 records a reset command).

In the present exemplary embodiment, the foregoing read command is, for example, a command to be executed by the user for reading data, a read command from the host system 11, or another read command corresponding to a single plane or multiple planes. In addition, a work executed according to the read command is a read operation.

The foregoing erase command is, for example, an erase command for erasing one single plane or multiple planes, which is configured to erase one or more physical erase units. In addition, a work executed according to the erase command is an erase operation.

The foregoing write command is, for example, a command to be executed by the user for writing user data, or a write command from the host system 11. In addition, a work executed according to the write command is a write operation.

The foregoing system command is, for example, a command sent by the memory management circuit 502 for managing the rewritable non-volatile memory module 406. For example, the system command includes a trash recycle command, a data merge command, a read command for reading system information, and a write command for writing system information. In addition, a work executed according to the system command is a system operation.

Moreover, the foregoing necessary command is a command that must be done. Specifically, the command description corresponding to the necessary command may be configured with at least one bit as a marker (e.g., a "necessary" marker). When this marker is a first status, it means that the command description has the necessary marker, and that the command corresponding to the command description is a necessary command that must be done. In the present exemplary embodiment, the command description of the write command for instructing writing user data has the "necessary" marker. In other words, the write command for instructing writing user data is one type of the necessary command. In addition, a work executed according to the necessary command is a necessary operation.

Conversely, the foregoing unnecessary command is a command that does not have the "necessary" marker. Alternatively, in one embodiment, the "necessary" marker of the command description corresponding to the unnecessary command is marked as a second status, wherein the second status is different from the first status. For example, the system command, the erase command, and the read command may also be the unnecessary command. In addition, a work executed according to the unnecessary command is an unnecessary operation. In other words, the work executed by the unnecessary command may be unexecuted. It should be noted that, in another embodiment, the command description corresponding to the unnecessary command may be additionally configured with at least one bit as a marker (e.g., an "unnecessary" marker). When the "unnecessary" marker is a third status, it means that the work executed by the event execution command corresponding to this "unnecessary" marker is an unnecessary operation.

In the present exemplary embodiment, the memory management circuit 502 stores in advance the memory parameter unit 631 corresponding to the non-operation command and the memory parameter unit 632 corresponding to the reset command to the buffer memory 508. When the memory management circuit 502 sends the non-operation command to the rewritable non-volatile memory module 406, the rewritable non-volatile memory module 406 does not perform any operation and accordingly replies to the memory management circuit 502 that the non-operation command has been executed. In addition, a work executed according to the non-operation command is a non-operation work.

When the memory management circuit 502 sends the reset command to the rewritable non-volatile memory module 406, the rewritable non-volatile memory module 406 performs a reset operation to be ready to receive and perform other commands. Moreover, the rewritable non-volatile memory module 406 replies to the memory management circuit 502 that the reset command has been executed after completing the reset operation. In addition, a work executed according to the reset command is a reset operation. In the present exemplary embodiment, the time that the rewritable non-volatile memory module 406 takes to execute the non-operation command is shorter than the time that the rewritable non-volatile memory module 406 takes to execute the other commands. Moreover, the time that the rewritable non-volatile memory module 406 takes to execute the reset command is shorter than the time that the rewritable non-volatile memory module 406 takes to execute the write command or the read command.

Referring FIG. 6 again, to schedule the works corresponding to the commands above, the memory management circuit 502 sequences and records a plurality of events in the work queue (e.g., a multi-trigger queue (MTQ)) 610, wherein each of the events respectively includes pointers 611 to 616 pointing to the memory parameter units 621 to 626. Moreover, the memory management circuit 502 executes the work queue 610 to process the events stored in the work queue 610. More specifically, the memory management circuit 502 sequentially reads the pointed memory parameter units 621 to 626 according to a sequence in which the pointers 611 to 616 of the events in the work queue 610 are stored in the work queue 610. Further, the memory management circuit 502 performs the corresponding commands/works according to the command descriptions stored in the pointed memory parameter units.

As FIG. 6 illustrates, suppose that the pointer 611 points to the memory parameter unit 621; the pointer 612 points to the memory parameter unit 622; the pointer 613 points to the memory parameter unit 623; the pointer 614 points to the memory parameter unit 624; the pointer 615 points to the memory parameter unit 625; and the pointer 616 points to the memory parameter unit 626. According to the sequence of the pointers 611 to 616 in the work queue 610, the memory management circuit 502 sequentially reads and executes the command descriptions recorded in the memory parameter units 621 to 626. For example, the read command corresponding to the command description recorded in the memory parameter unit 621 will be executed first, and the unnecessary command corresponding to the command description recorded in the memory parameter unit 626 will be executed last. It should be mentioned that in the present embodiment, the work queue 610 stores six events, and each of the events includes one pointer. However, the invention is not limited hereto. For example, in another exemplary embodiment, the work queue 610 may store events of another number, and each of the events may include pointers of another number.

As described above, in the present exemplary embodiment, the memory management circuit 502 determines whether a special event (e.g., a power failure event, a work queue quick execution event, or a work queue deletion event) that triggers the special processing procedure. For example, suppose that the special event is a power failure event. When receiving the power failure notification from the power management circuit 510, the memory management circuit 502 may determine that the power failure event occurs and suspend part of the works being executed so as to execute the special processing procedure. Specifically, the memory management circuit 502 may execute an interrupt for processing the power failure event and suspend operation of part of the hardware. The memory management circuit 502 may also suspend the work queue 610 being executed.

In the special processing procedure, the memory management circuit 502 may determine the events already scheduled (stored) in the work queue 610 to further effectively perform the necessary events in the work queue 610 by using the temporary power.

Specifically, the memory management circuit 502 may first identify the plurality of events currently stored in the work queue 610 according to an event distribution record and determine types of the events stored in the work queue 610. Next, according to the determined types of the events in the work queue 610, the works executed by the events in the work queue 610 are adjusted. More specifically, the memory management circuit 502 first identifies the types of the event execution commands pointed to by the pointers of the events in the work queue 610 according to the event distribution record. The memory management circuit 502 then determines the types of the events in the work queue according to the identified types of the event execution commands. It should be noted that the event distribution record may be stored in the read only memory of the memory management circuit 502, the random access memory, or another suitable memory. Moreover, in another embodiment, the memory management circuit 502 may directly (e.g., without the event distribution record) identify the types of the event execution commands by identifying the content of the event execution commands pointed to by the pointers of the events in the work queue 610.

In the present exemplary embodiment, according to a determined type of an event in the work queue 610, the memory management circuit 502 adjusts a work executed by the event in the work queue 610 from an originally executed specific work (also called a first work) to another specific work (also called a second work), wherein the first work is different from the second work. Specifically, the first work includes the read operation, the erase operation, and the system operation, the second work includes the non-operation work. However, in another embodiment, the second work may also be the reset operation. In the following, how the work executed by the event in the work queue 610 is adjusted from the first work to the second work according to the determined type of the event in the work queue 610 in the present exemplary embodiment will be described in more details.

In the present exemplary embodiment, when executing the special processing procedure, the memory management circuit 502 may divide the types of the event execution commands into three types. The event execution command of a first type (hereinafter also called a first type command) is command that may be directly skipped or unexecuted. In other words, the first type command is an event execution command that is unnecessary and may be removed (unexecuted) from a work schedule. Therefore, when the special processing procedure is executed, the first type command may be replaced by the non-operation command. The first type command is, for example, the read command or the system command.

The event execution command of a second type (hereinafter also called a second type command) refers to the event execution command that may be replaced by the reset command. In other words, when the special processing procedure is executed, the second type command may be replaced by the reset command. The second type command is, for example, a command that may affect reading/writing on multiple planes, the erase command, or one of another series of interrelated event execution commands. Thereby, errors of the rewritable non-volatile memory module 406 resulting from replacement of such interrelated commands may be prevented.

The event execution command of a third type (hereinafter also called a third type command) refers to event execution command that must be done. The third type command is, for example, the foregoing necessary command or the write command for writing user data.

For example, the pointer 611 points to the memory parameter unit 621, wherein the memory parameter unit 621 records the command description corresponding to the read command (in short, the pointer 611 points to the read command) and the read command is the first type command. According to the type of the read command (the first type), the memory management circuit 502 may determine that the event of the pointer 611 is the first type. In the same way, according to the types of the event execution commands pointed to by the pointers 612 to 616, the memory management circuit 502 respectively determines the types of the events of the pointers 612 to 616. For example, according to the foregoing determination method and example, the event of the pointer 612 will be determined to be the second type; the event of the pointer 613 will be determined to be the third type; the event of the pointer 614 will be determined to be the first type; the event of the pointer 615 will be determined to be the third type; and the event of the pointer 616 will be determined to be the first type.

In another embodiment, the memory management circuit 502 may directly identify the type of the event to which the pointer belongs by the form of the pointer of the event (e.g., the content code of the pointer). For example, in another embodiment, the memory management circuit 502 does not need to identify the type of the event execution command pointed to by the pointer of the event in the work queue, but may directly determine the type of the event to which the pointer belongs by the content coding of the pointer of the event in the work queue.

It should be noted that in the present exemplary embodiment, the unnecessary command pointed to by the pointer 616 is determined to be the first type, and the event to which the pointer 616 belongs is correspondingly determined to be the first type. However, in another exemplary embodiment, the unnecessary command pointed to by the pointer 616 is determined to be the second type, and the event to which the pointer 616 belongs is correspondingly determined to be the second type.

After determining the types of the events to which the pointers 611 to 616 belong, the memory management circuit 502 adjusts the pointers 611 to 616 according to the types of the events to which the pointers 611 to 616 belong. Specifically, the memory management circuit 502 determines whether to change the memory parameter units pointed to by the pointers 611 to 616 according to the types of the events to which the pointers 611 to 616 belong, so as to change the event execution commands executed according to the pointers 611 to 616 and further adjust the works executed by the events stored in the work queue 610. In short, the memory management circuit 502 determines whether to change the works executed by the events in the work queue 610 according to the types of the events stored in the work queue 610. In other words, in the present exemplary embodiment, the memory management circuit 502 may adjust the works executed by the events to which the pointers 611 to 616 belong by changing destinations (e.g., the memory parameter units) pointed to by the pointers 611 to 616.

Figure 7:
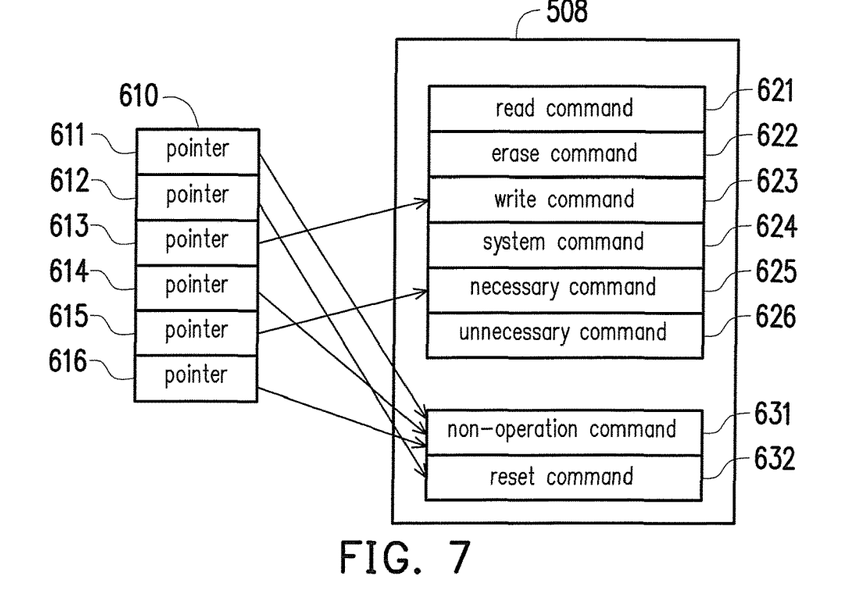
FIG. 7 is an operational schematic diagram of adjusting the pointers according to one exemplary embodiment of the invention.

FIG. 7 is an operational schematic diagram of adjusting the pointers according to one exemplary embodiment of the invention.

Referring to FIG. 7, according to the types of the events of the pointers 611 to 616, the memory management circuit 502 directs the pointers of the events of the first type to the memory parameter unit 631 corresponding to the non-operation command (namely, directing the pointers of the first type to the non-operation command) so as to adjust the works executed by the events of the first type from the first works (e.g., the read operation or the system operation, which belong to the first works) to the non-operation works; directs the pointers of the events of the second type to the memory parameter unit 632 corresponding to the reset command (namely, directing the pointers of the second type to the reset command) so as to adjust the works executed by the events of the second type from the first works (e.g., the erase operation, which belongs to the first works) to the reset operations; and does not change the memory parameter units pointed to by the pointers of the events of the third type (namely, keeping the event execution commands originally pointed to by the pointers of the third type or not adjusting the works executed by the events of the third type). It should be noted that in another exemplary embodiment, the manufacturer may also configure the memory management circuit 502 to direct the pointers of the events of the first type (or the second type) to a special command that does not affect the rewritable non-volatile memory module 406, and the execution time that this special command takes is shorter when compared to the other commands.

According to the example corresponding to FIG. 6 above, the memory management circuit 502 will adjust the pointers 611, 614, 616 of the events of the first type to point to the memory parameter unit 631; and will adjust the pointer 612 of the event of the second type to point to the memory parameter unit 621. Moreover, the memory management circuit 502 may keep the memory parameter units originally pointed to by the pointers 613, 615 of the events of the third type (for example, the pointer 613 still points to the memory parameter unit 623 and the pointer 615 still points to the memory parameter unit 625).

After completing the adjustment of the event execution command pointed to by the pointer of each of the events according to the type of each of the events in the work queue 610, the memory management circuit 502 may leave the interrupt for processing the power failure event, continue to restore channels of all of the hardware, and continue to execute the work queue 610. In one embodiment, the memory management circuit 502 may continue to execute the events not be executed yet in the work queue 610.

It should be noted that in the present exemplary embodiment, the memory management circuit 502 changes the memory parameter units pointed to by the pointers of the events of the first type and the second type. However, in another exemplary embodiment, the memory management circuit 502 may directly "skip" the pointers of the events of the first type or the second type (e.g., not executing the pointers of the first type or the second type) and executes the pointers of the events of the third type. For example, in the example above, the memory management circuit 502 executes the pointer 613 and the pointer 615 only. In other words, the memory management circuit 502 only sequentially executes the write command corresponding to the memory parameter unit 623 and the necessary command corresponding to the memory parameter unit 625.

In another exemplary embodiment, the memory management circuit 502 may remove the foregoing events of the first type and the second type from the work queue. And, the memory management circuit 502 may execute the corresponding event execution commands of the third type according to the unremoved events of the third type.

It should be mentioned that in one exemplary embodiment, if the work queue 610 does not include any event, the memory management circuit 502 may add a reset event in the work queue 610, and the reset event includes an pointer pointing to the reset command (e.g., pointing to the memory parameter unit 632). In another exemplary embodiment, if no reset event is executed before processing the event corresponding to the write command (also called the write event), the memory management circuit 502 may add a reset event before the event corresponding to the write command. In other words, before processing the write event, the memory management circuit 502 may process the reset event to execute the reset operation corresponding to the reset event.

Figure 8:
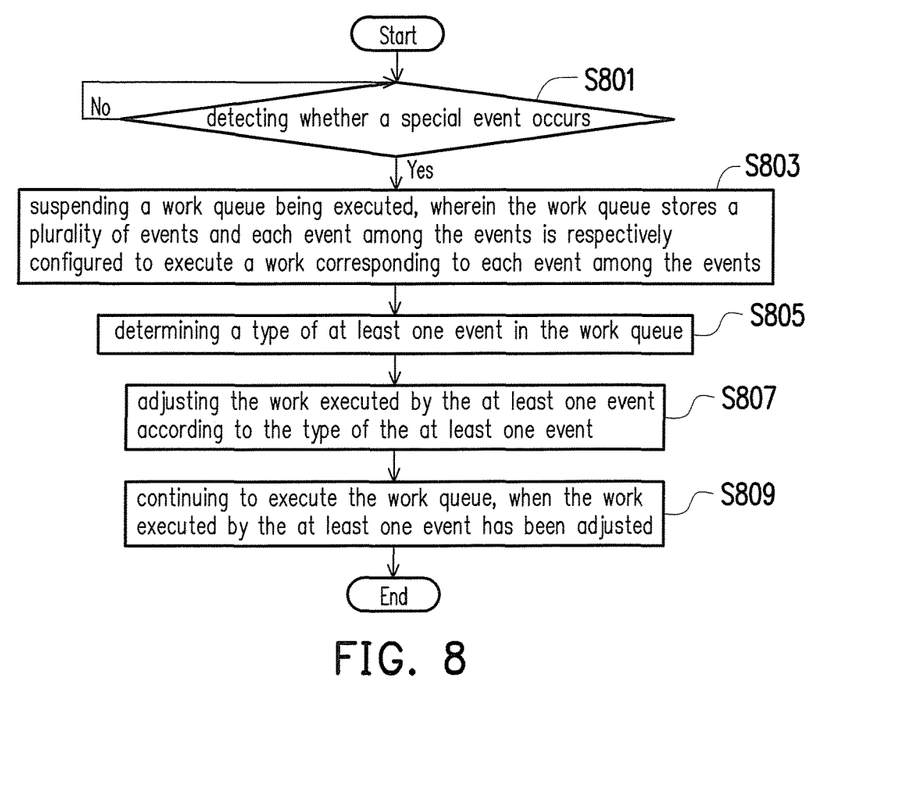
FIG. 8 is a flowchart illustrating steps of a memory management method according to one exemplary embodiment of the invention.

FIG. 8 is a flowchart illustrating steps of a memory management method according to one exemplary embodiment of the invention.

Referring to FIG. 8, in step S801, the memory management circuit 502 detects whether a special event occurs. If the special event occurs, continuing to step S803, the memory management circuit 502 suspends a work queue being executed. The work queue stores a plurality of events and each event among the events is respectively configured to execute a work corresponding to each event among the events. In step S805, the memory management circuit 502 determines a type of at least one event in the work queue. In step S807, the memory management circuit 502 adjusts the work executed by the at least one event according to the type of the at least one event. In step S809, when the work executed by the at least one event has been adjusted, the memory management circuit 502 continues to execute the work queue.

In summary of the above, the memory management method, the memory control circuit unit, and the memory storage apparatus provided in the exemplary embodiments of the invention can adjust the scheduled commands in the work queue and have the unnecessary command replaced by the non-operation command or the reset command, so as to greatly reduce the time (power) taken in processing the unnecessary command. Moreover, the remaining temporary power saved would be sufficient to execute the necessary command.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A memory management method for a rewritable non-volatile memory module, the memory management method comprising:

storing a plurality of first events into a work queue, wherein each of the first events respectively configured to execute different one of a plurality of first works;

when a special event is determined as not occurring, executing sequentially the plurality of the first works respectively corresponding to the plurality of first events in work queue;

when the special event is determined as occurring, determining type of each of the plurality of the first events in the work queue, and, according to the type of one of the first events, adjusting work to be executed by the one of the first events from a first work originally corresponding to the one of the first events to a second work, wherein the first work to be adjusted is different from the adjusted second work, and the second work is determined according to the type of the one of the first events; and waiting to execute the second work after the adjustment of the work to be executed by the one of the first events is completed.

2. The memory management method according to claim 1, further comprising suspending the work queue being executed and continuing to execute the work queue after the first work is adjusted to the second work.

3. The memory management method according to claim 1, wherein the first work comprises a read operation, an erase operation, or a system operation, wherein the second work comprises a non-operation work.

4. The memory management method according to claim 1, wherein the second work comprises a reset operation.

5. The memory management method according to claim 1, wherein each event among the events respectively comprises an pointer, wherein the pointer of each event among the events respectively points to one memory parameter unit corresponding to each event among the events, wherein the memory parameter unit corresponding to each event among the events stores an event execution command corresponding to each event among the events, the memory management method further comprising:

reading the event execution command corresponding to each event among the events stored in the memory parameter unit according to the memory parameter unit pointed to by the pointer of each event among the events if processing each event among the events; and executing the work corresponding to each event among the events according to the read event execution command.

6. The memory management method according to claim 5, wherein the step of determining the type of the at least one event in the work queue comprises:

identifying a type of an event execution command pointed to by an pointer of the at least one event; and determining the type of the at least one event in the work queue according to the identified type of the event execution command pointed to by the pointer of the at least one event.

7. The memory management method according to claim 6, wherein the step of adjusting the work executed by the at least one event from the first work to the second work according to the type of the at least one event further comprises:

adjusting the work executed by the at least one event from the first work to a non-operation work if the type of the at least one event is a first type;

adjusting the work executed by the at least one event from the first work to a reset work if the type of the at least one event is a second type; and not adjusting the work executed by the at least one event if the type of the at least one event is a third type.

8. The memory management method according to claim 7, wherein the event execution commands comprise a read command, a system command, an erase command, and a write command from a host system, wherein the system command is configured to manage the rewritable non-volatile memory module and the write command from the host system is configured to instruct writing user data to the rewritable non-volatile memory module, wherein the step of determining the type of the at least one event in the work queue according to the type of the event execution command pointed to by the pointer of the at least one event comprises:

determining the type of the at least one event to be the first type if the pointer of the at least one event points to the read command or the system command;

determining the type of the at least one event to be the second type if the pointer of the at least one event points to the erase command; and determining the type of the at least one event to be the third type if the pointer of the at least one event points to the write command from the host system.

9. The memory management method according to claim 1, wherein the step of adjusting the work executed by the at least one event from the first work to the second work according to the type of the at least one event comprises:

removing the at least one event from the work queue if the type of the at least one event is the first type or the second type.

10. The memory management method according to claim 1, wherein the special event comprises a power failure event, a work queue quick execution event, or a work queue deletion event.

11. A memory control circuit unit for controlling a memory storage apparatus, the memory control circuit unit comprising:

a host interface coupled to a host system;

a memory interface coupled to a rewritable non-volatile memory module; and a memory management circuit coupled to the host interface and the memory interface, wherein the memory management circuit is configured to store a plurality of first events into a work queue, wherein each of the first events respectively configured to execute different one of a plurality of first works, wherein the memory management circuit is further configured to, when a special event is determined as not occurring, execute sequentially the plurality of the first works respectively corresponding to the plurality of first events in the work queue, wherein the memory management circuit is further configured to, when the special event is determined as occurring, determine type of each of the plurality of the first events in the work queue, and, according to the type of one of the first events, adjust work to be executed by the one of the first events from a first work originally corresponding to the one of the first events to a second work, wherein the first work to be adjusted is different from the adjusted second work, and the second work is determined according to the type of the one of the first events, wherein the memory management circuit is further configured to wait to execute the second work after the adjustment of the work to be executed by the one of the first events is completed.

12. The memory control circuit unit according to claim 11, wherein the memory management circuit is configured to suspend the work queue being executed and continue to execute the work queue after the first work is adjusted to the second work.

13. The memory control circuit unit according to claim 11, wherein the first work comprises a read operation, an erase operation, or a system operation, wherein the second work comprises a non-operation work.

14. The memory control circuit unit according to claim 11, wherein the second work comprises a reset operation.

15. The memory control circuit unit according to claim 11, wherein each event among the events respectively comprises an pointer, wherein the pointer of each event among the events respectively points to one memory parameter unit corresponding to each event among the events, wherein the memory parameter unit corresponding to each event among the events stores one event execution command corresponding to each event among the events,
- wherein the memory management circuit is configured to execute the work queue to process the events in the work queue,
- wherein the memory management circuit is configured to read the event execution command corresponding to each event among the events stored in the memory parameter unit according to the memory parameter unit pointed to by the pointer of each event among the events if the memory management circuit processes each event among the events,
- wherein the memory management circuit is configured to execute the work corresponding to each event among the events according to the read event execution command.

16. The memory control circuit unit according to claim 15, wherein in the operation of the memory management circuit being further configured to determine the type of at least one event in the work queue,
- the memory management circuit identifies a type of an event execution command pointed to by an pointer of the at least one event,
- wherein the memory management circuit determines the type of the at least one event in the work queue according to the identified type of the event execution command pointed to by the pointer of the at least one event.

17. The memory control circuit unit according to claim 16, wherein in the operation of the memory management circuit being further configured to adjust the work executed by the at least one event from the first work to the second work according to the type of the at least one event,
- the memory management circuit adjusts the work executed by the at least one event from the first work to a non-operation work if the type of the at least one event is a first type,
- wherein the memory management circuit adjusts the work executed by the at least one event from the first work to a reset work if the type of the at least one event is a second type,
- wherein the memory management circuit does not adjust the work executed by the at least one event if the type of the at least one event is a third type.

18. The memory control circuit unit according to claim 17, wherein the event execution commands comprise a read command, a system command, an erase command, and a write command from a host system, wherein the system command is configured to manage the rewritable non-volatile memory module and the write command from the host system is configured to instruct writing user data to the rewritable non-volatile memory module, wherein in the operation of the memory management circuit determining the type of the at least one event in the work queue according to the identified type of the event execution command pointed to by the pointer of the at least one event,
- the memory management circuit determines the type of the at least one event to be the first type if the pointer of the at least one event points to the read command or the system command,
- wherein the memory management circuit determines the type of the at least one event to be the second type if the pointer of the at least one event points to the erase command,
- wherein the memory management circuit determines the type of the at least one event to be the third type if the pointer of the at least one event points to the write command from the host system.

19. The memory control circuit unit according to claim 11, wherein in the operation of the memory management circuit being further configured to adjust the work executed by the at least one event from the first work to the second work according to the type of the at least one event,
- the memory management circuit removes the at least one event from the work queue if the type of the at least one event is the first type or the second type.

20. The memory control circuit unit according to claim 11, wherein the special event comprises a power failure event, a work queue quick execution event, or a work queue deletion event.

21. A memory storage apparatus comprising:
- a connection interface unit configured to couple to a host system;
- a rewritable non-volatile memory module; and
- a memory control circuit unit coupled to the connection interface unit and the rewritable non-volatile memory module,
- wherein the memory control circuit unit is configured to store a plurality of first events into a work queue, wherein each of the first events respectively configured to execute different one of a plurality of first works,
- wherein the memory control circuit unit is further configured to, when a special event is determined as not occurring, execute sequentially the plurality of the first works respectively corresponding to the plurality of first events in the work queue,
- wherein the memory control circuit unit is further configured to, when the special event is determined as occurring, determine type of each of the plurality of the first events in the work queue, and, according to the type of one of the first events, adjust work to be executed by the one of the first events from a first work originally corresponding to the one of the first events to a second work, wherein the first work to be adjusted is different from the adjusted second work, and the second work is determined according to the type of the one of the first events,
- wherein the memory control circuit unit is further configured to wait to execute the second work after the adjustment of the work to be executed by the one of the first events is completed.

22. The memory storage apparatus according to claim 21, wherein the memory control circuit unit is configured to suspend the work queue being executed and continues to execute the work queue after the first work is adjusted to the second work.

23. The memory storage apparatus according to claim 21, wherein the first work comprises a read operation, an erase operation, or a system operation,
- wherein the second work comprises a non-operation work.

24. The memory storage apparatus according to claim 21, wherein the second work comprises a reset operation.

25. The memory storage apparatus according to claim 21, wherein each event among the events respectively comprises an pointer, wherein the pointer of each event among the events respectively points to one memory parameter unit corresponding to each event among the events, wherein the memory parameter unit corresponding to each event among the events stores one event execution command corresponding to each event among the events,
   wherein the memory control circuit unit is configured to execute the work queue to process the events in the work queue,
   wherein the memory control circuit unit is configured to read the event execution command corresponding to each event among the events stored in the memory parameter unit according to the memory parameter unit pointed to by the pointer of each event among the events if the memory control circuit unit processes each event among the events,
   wherein the memory control circuit unit is configured to execute the work corresponding to each event among the events according to the read event execution command.

26. The memory storage apparatus according to claim 25, wherein in the operation of the memory control circuit unit being further configured to determine the type of at least one event in the work queue,
   the memory control circuit unit identifies a type of an event execution command pointed to by an pointer of the at least one event,
   wherein the memory control circuit unit determines the type of the at least one event in the work queue according to the identified type of the event execution command pointed to by the pointer of the at least one event.

27. The memory storage apparatus according to claim 26, wherein in the operation of the memory control circuit unit being further configured to adjust the work executed by the at least one event from the first work to the second work according to the type of the at least one event,
   the memory control circuit unit adjusts the work executed by the at least one event from the first work to a non-operation work if the type of the at least one event is a first type,
   wherein the memory control circuit unit adjusts the work executed by the at least one event from the first work to a reset work if the type of the at least one event is a second type,
   wherein the memory control circuit unit does not adjust the work executed by the at least one event if the type of the at least one event is a third type.

28. The memory storage apparatus according to claim 27, wherein the event execution commands comprise a read command, a system command, an erase command, and a write command from a host system, wherein the system command is configured to manage the rewritable non-volatile memory module and the write command from the host system is configured to instruct writing user data to the rewritable non-volatile memory module, wherein in the operation of the memory control circuit unit determining the type of the at least one event in the work queue according to the identified type of the event execution command pointed to by the pointer of the at least one event,
   the memory control circuit unit determines the type of the at least one event to be the first type if the pointer of the at least one event points to the read command or the system command,
   wherein the memory control circuit unit determines the type of the at least one event to be the second type if the pointer of the at least one event points to the erase command,
   wherein the memory control circuit unit determines the type of the at least one event to be the third type if the pointer of the at least one event points to the write command from the host system.

29. The memory storage apparatus according to claim 21, wherein in the operation of the memory control circuit unit being further configured to adjust the work executed by the at least one event from the first work to the second work according to the type of the at least one event,
   the memory control circuit unit removes the at least one event from the work queue if the type of the at least one event is the first type or the second type.

30. The memory storage apparatus according to claim 21, wherein the special event comprises a power failure event, a work queue quick execution event, or a work queue deletion event.

* * * * *